(12) United States Patent
Qian et al.

(10) Patent No.: US 11,353,138 B1
(45) Date of Patent: Jun. 7, 2022

(54) PISTON VALVE CORE STRUCTURE WITH RIGID RING SURFACE COMBINED WITH FLEXIBLE BASE SURFACE AND METHOD THEREOF

(71) Applicant: ZHEJIANG UNIVERSITY, Hangzhou (CN)

(72) Inventors: Jinyuan Qian, Hangzhou (CN); Juan Mu, Hangzhou (CN); Congwei Hou, Hangzhou (CN); Zhijiang Jin, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/253,627

(22) PCT Filed: May 12, 2020

(86) PCT No.: PCT/CN2020/089866
§ 371 (c)(1),
(2) Date: Dec. 18, 2020

(87) PCT Pub. No.: WO2021/022860
PCT Pub. Date: Feb. 11, 2021

(30) Foreign Application Priority Data

Aug. 7, 2019 (CN) .......................... 201910726310.4

(51) Int. Cl.
*F16K 39/02* (2006.01)
*F16K 1/54* (2006.01)
*F16K 1/36* (2006.01)

(52) U.S. Cl.
CPC .............. *F16K 39/022* (2013.01); *F16K 1/36* (2013.01); *F16K 1/54* (2013.01)

(58) Field of Classification Search
CPC ........................................................ F16K 1/54
See application file for complete search history.

(56) References Cited

U.S. PATENT DOCUMENTS 2,851,243 A * 9/1958 Tannock .................... F16K 1/36
251/332
3,794,295 A * 2/1974 Huber ..................... F16K 1/465
251/189

(Continued)

FOREIGN PATENT DOCUMENTS

| CN | 201496569 U | 6/2010 |
| CN | 208763878 U | 4/2019 |
| CN | 110594426 A | 12/2019 |

OTHER PUBLICATIONS

International Search Report (PCT/CN2020/089866); dated Aug. 5, 2020.

*Primary Examiner* — Eric Keasel
(74) *Attorney, Agent, or Firm* — W&G Law Group

(57) ABSTRACT

Provided are a piston valve core structure with a combination of a rigid ring surface and a flexible base surface, and a method thereof. The structure includes a piston valve core, a flexible base surface, a rigid ring surface and a connecting member; a bottom surface of the piston valve core is planar; a top surface of the flexible base surface fits to the piston valve core, and a bottom surface thereof is a ellipsoidal convex surface; the rigid ring surface is a ring body with a stepped cross-section, and is coaxially arranged under the flexible base surface; a protruding height of the flexible base surface is greater than that of the rigid ring surface; the connecting member is configured to connect respective structures. The piston valve core structure can overcome unbalanced moment on the valve core, has a simple structure, and can be widely promoted and applied.

10 Claims, 2 Drawing Sheets

(56) References Cited

U.S. PATENT DOCUMENTS 7,815,164 B2 * 10/2010 Dong .................... F16K 47/04
 251/121
2017/0037972 A1 2/2017 Farris

* cited by examiner

PISTON VALVE CORE STRUCTURE WITH RIGID RING SURFACE COMBINED WITH FLEXIBLE BASE SURFACE AND METHOD THEREOF

TECHNICAL FIELD

The present disclosure relates to a piston valve core structure, and particularly, to a piston valve core structure with a combination of a rigid ring surface and a flexible base surface, and a method thereof for avoiding unbalanced moment.

BACKGROUND

In a horizontally arranged valve adopting a piston valve core structure, a force on a bottom surface of a valve core shows an obvious imbalance phenomenon, a lower surface of the bottom surface of the valve core is subjected a larger pressure near a fluid outlet side than that near a fluid inlet side, unbalanced pressure distribution creates unbalanced moment on the bottom surface of the valve core and causes a wall surface of the valve core to squeeze against a sealing position, thereby not only increasing drive energy consumption and affecting sealing performance, but even causing leakage failure of a valve under high flow rate conditions.

Currently, the piston valve structures on the market have less improved design for the unbalanced moment subjected by the valve core. Chinese patent application CN108317298A discloses a low-leakage pilot-operated single-seat regulating valve core structure, which is processed with flow channels at a portion that serves as a small valve core at a lower end of a valve stem and a shoulder of the valve stem, for communicating an inner cavity of the valve core with a valve inlet flow channel, in order to reduce an unbalanced force subjected by the small valve core when it is opened. However, the valve core structure is more complicated and not universal enough.

SUMMARY

In order to avoid the phenomenon of the unbalanced force of the existing piston valve core, a purpose of the present disclosure is to provide a piston valve core structure with a combination of a rigid ring surface and a flexible base surface.

In order to achieve the above purpose, the technical solutions adopted by the present disclosure are as follows:

A piston valve core structure with a combination of a rigid ring surface and a flexible base surface includes: a connecting member; and a piston valve core, a flexible base surface, a rigid ring surface, and a connecting member that are sequentially stacked and assembled from top to bottom; a bottom surface of the piston valve core is a planar surface; the flexible base surface has a thin edge and a thick middle portion in such a manner that a top surface thereof fits to the bottom surface of the piston valve core, and a bottom surface is an ellipsoidal convex surface; the flexible base surface is made of a flexible material and is deformable when the bottom surface is subjected to an external force; the rigid ring surface is a ring body with a stepped cross-section, and a bottom surface thereof serves as a contact surface between the valve core structure and the valve seat; the rigid ring surface is coaxially arranged on an edge of the bottom surface of the flexible base surface, and with reference to the bottom surface of the piston valve core, a protruding height of a center of the ellipsoidal convex surface of the flexible base surface is greater than a protruding height of the rigid ring surface; the connecting member is configured to connect the piston valve core, the flexible base surface and the rigid ring surface so as to allow them to be assembled into an entirety.

Preferably, the connecting member is a connecting screw, a plurality of threaded holes are evenly distributed on the bottom surface of the piston valve core along a circumferential direction; a bottom of the flexible base surface is provided with a plurality of first through holes corresponding to the plurality of threaded holes; a bottom of the rigid ring surface is provided with a plurality of second through holes corresponding to the plurality of threaded holes; each of the plurality of connecting screws is screwed into and fixed in one group of a threaded hole, a first through hole and a second through hole that are coaxial.

Preferably, the flexible base surface is made of a polyurethane material.

Preferably, the bottom surface of the rigid ring surface is a stepped surface matching a top surface of the valve seat, and the bottom surface of the rigid ring surface and the top surface of the valve seat are engaged hermetically.

Preferably, the piston valve core, the flexible base surface and the rigid ring surface have an equal outer diameter.

Further, each of the plurality of second through holes of the rigid ring surface is a countersunk hole, and the countersunk hole has a diameter greater than a screw head of each of the plurality of connecting screws, a depth greater than a thickness of the screw head of each of the plurality of connecting screws.

Still further, the number of the plurality of threaded holes, the number of the plurality of first through holes, and the number of the plurality of second through holes are all 8; the connecting member is 8 countersunk screws.

Further, the plurality of threaded holes, the plurality of first through holes, and the plurality of second through holes have an equal hole diameter.

Another object of the present disclosure is to provide a method for avoiding unbalanced moment by using the piston valve core structure according to any one of the above solutions. Specifically, the piston valve core structure is stalled on the valve seat, and the bottom surface of the rigid ring surface serves as a sealing contact surface between the valve core structure and the valve seat; when the valve is opened and fluid flows out through a gap between the rigid ring surface and the valve seat, the fluid directly applies fluid forces of different magnitudes at different sites on the bottom surface of the flexible base surface and leads to different degrees of deformation of the flexible base surface to absorb unbalanced moment acting on the bottom surface of the valve core, balancing a pressure distribution on the bottom surface of the piston valve core.

Preferably, the flexible base surface is rotated by 90° after every certain period of use.

The above technical solutions of the present disclosure have following advantages over the related art:

(1) The piston valve core structure with a combination of a rigid ring surface and a flexible base surface of the present disclosure, through good elasticity of the flexible base surface, is deformed at different degrees of deformation occur at sites subjected to different pressures, to overcome the unbalanced moment of the bottom surface of the piston valve core.

(2) The piston valve core structure of the present disclosure with a combination of a rigid ring surface and a flexible base surface adopts the stepped surface at the contact surface between the valve core structure and the valve seat, to prevent leakage caused by the change of the valve core structure, thereby ensuring a sealing performance of the valve.

(3) The present disclosure has simple structure, convenient to manufacture, and is suitable for most valves with circular valve core structures.

Figure 1:
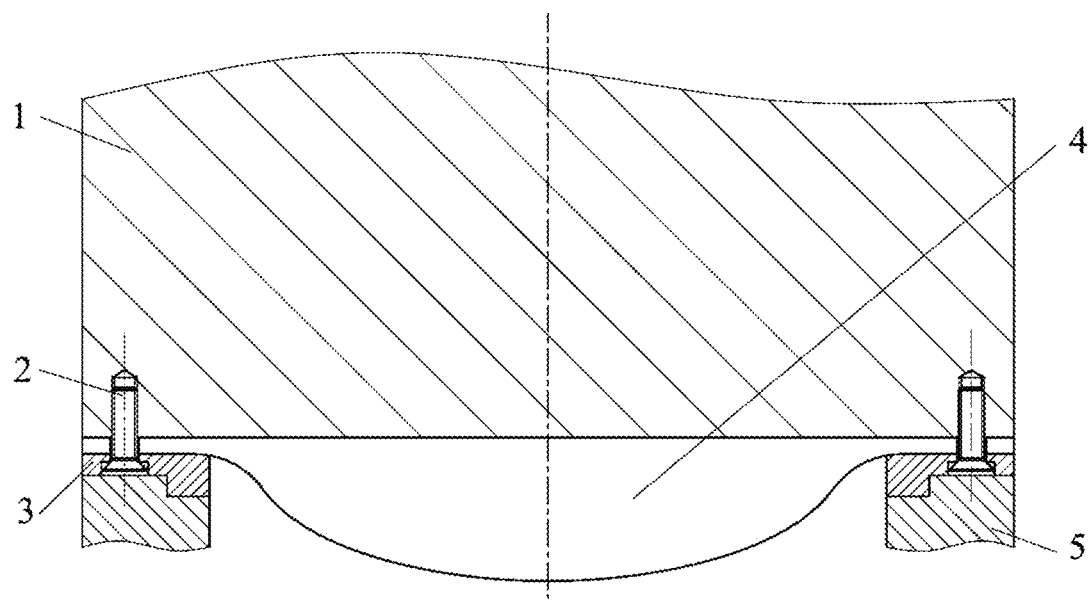
FIG. 1 is a cross-sectional view of a piston valve core structure with a combination of a rigid ring surface and a flexible base surface according to the present disclosure when it is closed.

Reference signs in the drawings: 1. piston valve core; 2. connecting member; 3. rigid ring surface; 4. flexible base surface; 5. valve seat.

DESCRIPTION OF EMBODIMENTS

The present disclosure will be further described below with reference to the drawings.

Figure 2:
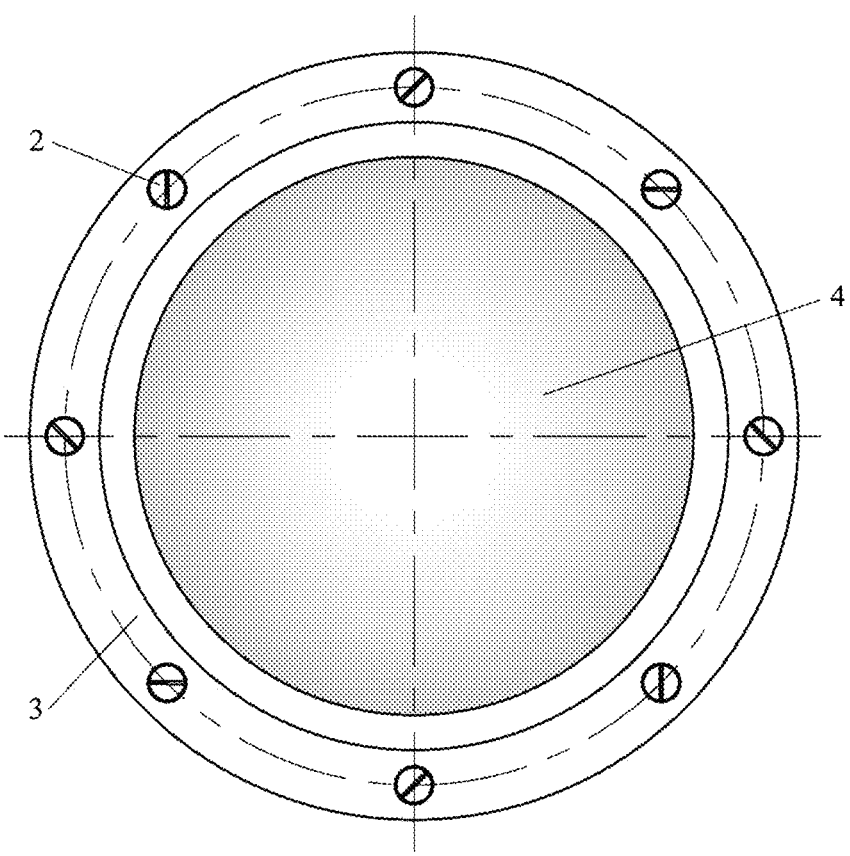
FIG. 2 is a bottom view of a piston valve core structure with a combination of a rigid ring surface and a flexible base surface according to the present disclosure.

FIG. 1 and FIG. 2 illustrate a piston valve core structure with a combination of a rigid ring surface and a flexible base surface in a preferred embodiment of the present disclosure. The piston valve core structure is configured to be installed above a valve seat 5 for use. A main structure thereof includes a connecting member 2, and a piston valve core 1, a flexible base surface 4 and a rigid ring surface 3 that are sequentially stacked and assembled from top to bottom.

The piston valve core 1 is a cylinder with a planar bottom surface. The flexible base surface 4 is an irregular convex body with a thin edge and a thick middle portion in such a manner that a top surface thereof is a planar surface and fits to the bottom surface of the piston valve core 1, whereas a middle portion of the bottom surface is a semi-ellipsoidal convex surface, and a ring-shaped edge of the bottom surface serves as a fixed portion. The flexible base surface 4 is made of a flexible material and is deformable when the bottom surface is subjected to an external force. In the present embodiment, the flexible base surface 4 is made of polyurethane material.

In addition, the rigid ring surface 3 is a ring body with a stepped cross-section, and a bottom surface thereof serves as a contact surface between the valve core structure and the valve seat 5. The rigid ring surface 3 is coaxially fitted on an edge of the bottom surface of the flexible base surface 4. The piston valve core 1, the flexible base surface 4 and the rigid ring surface 3 have an equal outer diameter. The connecting member 2 is configured to connect the piston valve core 1 with the flexible base surface 4 and the rigid ring surface 3, so as to allow them to be assembled into an entirety.

In the above piston valve core structure, the bottom surface of the rigid ring surface 3 is a stepped surface that matches a top surface of the valve seat 5 located under the rigid ring surface 3, the bottom surface of the rigid ring surface 3 serves as the contact surface with the top surface of the valve seat 5, and the two surfaces are able to be engaged hermetically. Undoubtedly, such an engagement is not fixed, but can be adjusted between sealed or unsealed states according to opening and closing of the valve. When the valve is opened, the bottom surface of the rigid ring surface 3 keeps a certain distance from the top surface of the valve seat 5, to form a channel for fluid to flow out.

Figure 3:
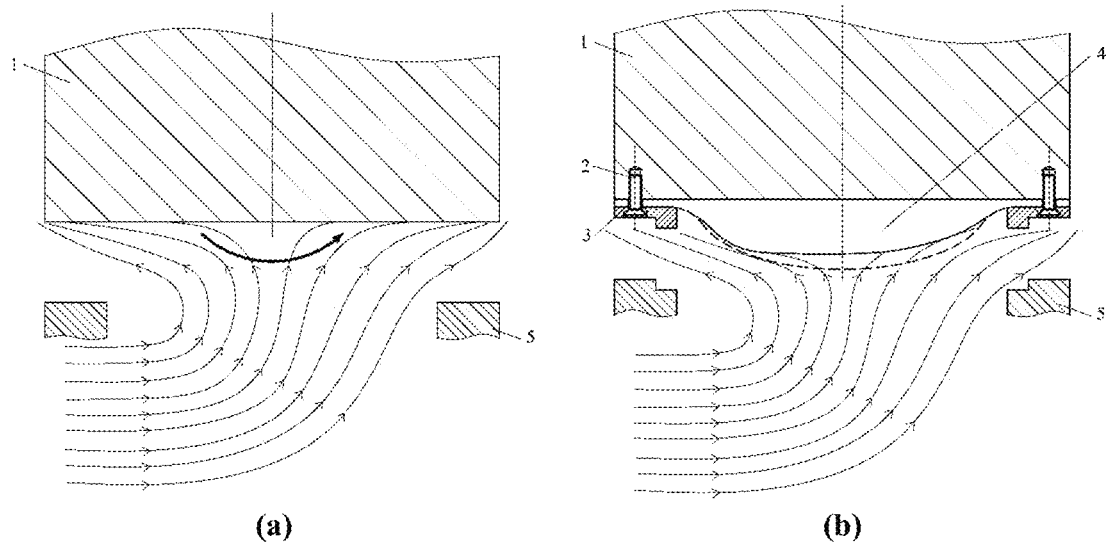
FIG. 3 is a schematic diagram of two types of valve cores subjected to unbalanced moment; where (a) is a schematic diagram of fluid distribution and unbalanced moment subjected by a valve core when the piston valve core is opened; (b) is a schematic diagram of fluid distribution and the flexible base surface being deformed to overcome the unbalanced moment when the piston valve core structure with a combination of a rigid ring surface and a flexible base surface according to the present disclosure is opened.

As shown in FIG. 3a, in a general piston valve core structure, when the piston valve core 1 is opened, the fluid flows out through a gap between the piston valve core 1 and the valve seat 5, the fluid, due to the uneven distribution thereof, applies different pressures at different portions on the bottom surface of the piston valve core 1, resulting that the piston valve core 1 is subjected to an unbalanced moment, and generating a turning tendency as shown in FIG. 3a.

However, in the valve core structure according to the present disclosure, one flexible base surface 4 is additionally provided to absorb the unbalanced moment, which is configured to generate, through good elasticity of the flexible base surface, different degrees of deformation at the portions subjected to the different pressures, thereby absorbing the unbalanced moment that may act on the bottom surface of the valve core. As shown in FIG. 3b, according to the present application, in the piston valve core structure with the combination of the rigid ring surface and the flexible base surface, when the valve core structure is opened, the fluid flows out through a gap between the rigid ring surface 3 and the valve seat 5, the fluid, due to its uneven distribution, applies different pressures at different sites on the bottom surface of the flexible base surface 4, thereby resulting in different degrees of deformation in different sites of the bottom surface of the flexible base surface 4. The unbalanced moment that may act on the bottom surface of the piston valve core 1 can be absorbed by the elastic deformation of the flexible base surface 4, and thus the pressure distribution on the bottom surface of the piston valve core 1 becomes even, thereby avoiding the unbalanced moment.

Based on the above mechanism, in order to enable the flexible base surface 4 to use its own elasticity to achieve the absorption of the unbalanced moment, the flexible base surface 4 should protrude more higher than the rigid ring surface 3. Referring to FIG. 1, with reference to the bottom surface of the piston valve core 1, a protruding height of a center of the ellipsoidal convex surface of the flexible base surface 4 should be greater than a protruding height of the rigid ring surface 3, that is, a center of the bottom surface of the flexible base surface 4 is lower than the bottom surface of the rigid ring surface 3 in height, preventing the rigid ring surface 3 from causing disturbances to the fluid and introducing new unbalanced moment. A specific protruding height of the flexible base surface 4 can be tested and adjusted as required.

In addition, in this embodiment, in order to facilitate the assembly, the connecting member 2 is a connecting screw. Accordingly, 8 threaded holes are evenly distributed on the bottom surface of the piston valve core 1 in a circumferential direction; bottom of the flexible base surface 4 is provided with 8 first through holes corresponding to the threaded holes; bottom of the rigid ring surface 3 is provided with 8 second through holes corresponding to the threaded holes. The connecting screws are countersunk screws, and the number is also 8. The second through hole of the rigid ring surface 3 is a countersunk hole, a diameter of the countersunk is greater than a diameter of a screw head of the connecting screw, a depth of the countersunk hole is greater than a thickness of the screw head of the connecting screw, so that the screw is built into the hole. Preferably, the hole diameters of the threaded hole, the first through hole, and the second through hole are equal. The connecting screws are screwed into each group of the coaxial threaded hole, the first through hole and the second through hole to achieve fixation. Without doubt, the specific number of the screws and the holes can also be adjusted as needed. Similarly, in addition to screw connection, other connecting members can also be used for connection.

Based on the above-mentioned piston valve core structure, a method for avoiding the unbalanced moment in the valve is provided. Specifically, the piston valve core structure is stalled on the valve seat 5, and the bottom surface of the rigid ring surface 3 serves as a sealing contact surface between the valve core structure and the valve seat 5; when the valve is opened and fluid flows out through a gap between the rigid ring surface 3 and the valve seat 5, the fluid directly applies fluid forces of different magnitudes at different sites on the bottom surface of the flexible base surface 4 and leads to different degrees of deformation of the flexible base surface 4 to absorb unbalanced moment acting on the bottom surface of the valve core, balancing a pressure distribution on the bottom surface of the piston valve core 1.

In order to prevent a specific site of the flexible base surface 4 from being repeatedly subjected to relatively large pressure, after a certain period of use, the flexible base surface 4 can be rotated 90° in a fixing direction, in order to keep the effect of avoiding the unbalanced moment. After rotating by three times, a new flexible base surface 4 is replaced.

The above-mentioned embodiments are only preferred solutions of the present disclosure, but not intended to limit the present disclosure. Those of ordinary skill in the art can make various changes and modifications without departing from the spirit and scope of the present disclosure. All technical solutions obtained by equivalent substitutions or equivalent transformations shall fall within the protection scope of the present disclosure.

What is claimed is:

1. A piston valve core structure with a combination of a rigid ring surface and a flexible base surface, comprising:
    a connecting member (2); and
    a piston valve core (1), a flexible base surface (4) and a rigid ring surface (3) that are sequentially stacked and assembled from top to bottom,
    wherein a bottom surface of the piston valve core (1) is a planar surface;
    the flexible base surface (4) has a thin edge and a thick middle portion in such a manner that a top surface of the flexible base surface (4) fits to the bottom surface of the piston valve core (1), and a bottom surface of the flexible base surface (4) is an ellipsoidal convex surface; the flexible base surface (4) is made of a flexible material and is deformable when the bottom surface thereof is subjected to an external force;
    the rigid ring surface (3) is a ring body with a stepped cross-section, and a bottom surface of the rigid ring surface (3) serves as a contact surface between the valve core structure and the valve seat (5);
    the rigid ring surface (3) is coaxially arranged on an edge of the bottom surface of the flexible base surface (4), and with reference to the bottom surface of the piston valve core (1), a protruding height of a center of the ellipsoidal convex surface of the flexible base surface (4) is greater than a protruding height of the rigid ring surface (3); and
    the connecting member (2) is configured to connect the piston valve core (1) with the flexible base surface (4) and the rigid ring surface (3), so as to assemble them into an entirety.

2. The piston valve core structure with a combination of a rigid ring surface and a flexible base surface according to claim 1, wherein the connecting member (2) is a connecting screw, a plurality of threaded holes are evenly distributed on the bottom surface of the piston valve core (1) along a circumferential direction; a bottom of the flexible base surface (4) is provided with a plurality of first through holes corresponding to the plurality of threaded holes; a bottom of the rigid ring surface (3) is provided with a plurality of second through holes corresponding to the plurality of threaded holes; each of the plurality of connecting screws is screwed into and fixed in one group of a threaded hole, a first through hole and a second through hole that are coaxial.

3. The piston valve core structure with a combination of a rigid ring surface and a flexible base surface according to claim 2, wherein each of the plurality of second through holes of the rigid ring surface (3) is a countersunk hole, and the countersunk hole has a diameter greater than a screw head of each of the plurality of connecting screws, a depth greater than a thickness of the screw head of each of the plurality of connecting screws.

4. The piston valve core structure with a combination of a rigid ring surface and a flexible base surface according to claim 3, wherein a number of the plurality of threaded holes, a number of the plurality of first through holes, and a number of the plurality of second through holes are all 8; the connecting member (2) is 8 countersunk screws.

5. The piston valve core structure with a combination of a rigid ring surface and a flexible base surface according to claim 2, wherein the plurality of threaded holes, the plurality of first through holes, and the plurality of second through holes have an equal hole diameter.

6. The piston valve core structure with a combination of a rigid ring surface and a flexible base surface according to claim 1, wherein the flexible base surface (4) is made of a polyurethane material.

7. The piston valve core structure with a combination of a rigid ring surface and a flexible base surface according to claim 1, wherein the bottom surface of the rigid ring surface (3) is a stepped surface matching a top surface of the valve seat (5), and the bottom surface of the rigid ring surface (3) and the top surface of the valve seat (5) are engaged hermetically.

8. The piston valve core structure with a combination of a rigid ring surface and a flexible base surface according to claim 1, wherein the piston valve core (1), the flexible base surface (4) and the rigid ring surface (3) have an equal outer diameter.

9. A method for avoiding unbalanced moment by using the piston valve core structure according to claim 1, wherein the piston valve core structure is stalled on the valve seat (5), and the bottom surface of the rigid ring surface (3) serves as a sealing contact surface between the valve core structure and the valve seat (5);
    when the valve is opened and fluid flows out through a gap between the rigid ring surface (3) and the valve seat (5), the fluid directly applies fluid forces of different magnitudes at different sites on the bottom surface of the flexible base surface (4) and leads to different degrees of deformation of the flexible base surface (4) to absorb unbalanced moment acting on the bottom surface of the valve core, balancing a pressure distribution on the bottom surface of the piston valve core (1).

10. The method for avoiding unbalanced moment according to claim 9, wherein the flexible base surface (4) is rotated by 90° after every certain period of use.

* * * * *